United States Patent
Katayama et al.

(10) Patent No.: US 10,205,142 B2
(45) Date of Patent: Feb. 12, 2019

(54) BATTERY, BATTERY PACK, AND METHOD OF MANUFACTURING BATTERY

(71) Applicants: TOYOTA JIDOSHA KABUSHIKI KAISHA, Toyota-shi, Aichi (JP); KOJIMA INDUSTRIES CORPORATION, Toyota-shi, Aichi (JP)

(72) Inventors: Junta Katayama, Miyoshi (JP); Tsuyoshi Hayashi, Miyoshi (JP); Kenji Kimura, Miyoshi (JP); Masahiro Imai, Nissin (JP); Ryogo Murayama, Toyota (JP); Tomotaka Osakabe, Miyoshi (JP)

(73) Assignees: TOYOTA JIDOSHA KABUSHIKI KAISHA, Toyota (JP); KOJIMA INDUSTRIES CORPORATION, Toyota (JP)

( * ) Notice: Subject to any disclaimer, the term of this patent is extended or adjusted under 35 U.S.C. 154(b) by 62 days.

(21) Appl. No.: 14/417,608

(22) PCT Filed: Apr. 11, 2013

(86) PCT No.: PCT/JP2013/002462
§ 371 (c)(1),
(2) Date: Jan. 27, 2015

(87) PCT Pub. No.: WO2014/045485
PCT Pub. Date: Mar. 27, 2014

(65) Prior Publication Data
US 2015/0311484 A1   Oct. 29, 2015

(30) Foreign Application Priority Data
Sep. 18, 2012 (JP) .................... 2012-204036

(51) Int. Cl.
*H01M 2/10* (2006.01)
*H01M 2/20* (2006.01)
(Continued)

(52) U.S. Cl.
CPC ....... *H01M 2/1016* (2013.01); *H01M 2/1077* (2013.01); *H01M 2/206* (2013.01);
(Continued)

(58) Field of Classification Search
CPC ........... H01M 2/1077; H01M 10/6556; H01M 10/6551; H01M 10/0431; H01M 10/052;
(Continued)

(56) References Cited

U.S. PATENT DOCUMENTS

2008/0004088 A1 * 1/2008 Lundell ................. H04M 1/026
455/575.1
2008/0292946 A1 * 11/2008 Lee ..................... H01M 10/0431
429/94
(Continued)

FOREIGN PATENT DOCUMENTS

CN  101662035 A  3/2010
EP  0 267 242 B1  4/1991
(Continued)

*Primary Examiner* — Jonathan G Jelsma
*Assistant Examiner* — Omar M Kekia
(74) *Attorney, Agent, or Firm* — Oliff PLC

(57) ABSTRACT

A battery including a plurality of cells housed in a battery container, wherein the battery container is formed of an insulating material and includes a plurality of housing portions formed by an inner wall portion of the battery container, each of the housing portions housing an associated one of the cells, and a conductive member for use in connecting the plurality of cells is embedded in a wall portion of the battery container. The housing portion has a shape conforming to an outer face of the cell and is in contact with the outer face of the cell.

6 Claims, 9 Drawing Sheets

(51) Int. Cl.

| | |
|---|---|
| *H01M 10/6556* | (2014.01) |
| *H01M 10/6551* | (2014.01) |
| *H01M 10/04* | (2006.01) |
| *H01M 10/625* | (2014.01) |
| *H01M 10/615* | (2014.01) |
| *H01M 10/6563* | (2014.01) |
| *H01M 10/647* | (2014.01) |
| *H01M 10/613* | (2014.01) |
| *H01M 10/052* | (2010.01) |
| *H01M 10/0587* | (2010.01) |

(52) U.S. Cl.
CPC ..... *H01M 10/0431* (2013.01); *H01M 10/613* (2015.04); *H01M 10/615* (2015.04); *H01M 10/625* (2015.04); *H01M 10/647* (2015.04); *H01M 10/6551* (2015.04); *H01M 10/6556* (2015.04); *H01M 10/6563* (2015.04); *H01M 10/052* (2013.01); *H01M 10/0587* (2013.01); *H01M 2220/20* (2013.01); *Y02E 60/122* (2013.01); *Y02P 70/54* (2015.11)

(58) Field of Classification Search
CPC ......... H01M 10/0587; H01M 2220/20; H01M 10/625; H01M 10/615; H01M 10/6563; H01M 10/647; H01M 10/613; H01M 2/1016; H01M 2/206; Y02T 10/7011

USPC .......................................... 429/94; 29/623.5
See application file for complete search history.

(56) References Cited

U.S. PATENT DOCUMENTS

| | | | |
|---|---|---|---|
| 2009/0191448 | A1* | 7/2009 | Yamamoto ............. B29C 70/72 429/94 |
| 2010/0055993 | A1 | 3/2010 | Ikeda et al. |
| 2011/0052976 | A1 | 3/2011 | Ishii et al. |
| 2011/0229754 | A1* | 9/2011 | Zhao ................. H01M 10/0413 429/158 |
| 2012/0177970 | A1* | 7/2012 | Marchio ............. H01M 2/0237 429/120 |

FOREIGN PATENT DOCUMENTS

| | | |
|---|---|---|
| JP | S63-503341 A | 12/1988 |
| JP | 2006-134803 A | 5/2006 |
| JP | 2010-055885 A | 3/2010 |
| JP | 2010-113961 A | 5/2010 |
| JP | 2011-071109 A | 4/2011 |
| JP | 2012-009332 A | 1/2012 |
| WO | 87/07434 A1 | 12/1987 |

* cited by examiner

BATTERY, BATTERY PACK, AND METHOD OF MANUFACTURING BATTERY

TECHNICAL FIELD

The present invention relates to a battery including a plurality of cells housed in a battery container.

BACKGROUND ART

In recent years, attention has been paid to batteries used as the power source for various types of equipment. Patent Document 1 has disclosed a battery including a tab protruding in spiral form from each end face of a flat electrode group, a sandwiching member including a first sandwiching portion and a second sandwiching portion respectively sandwiching two bundles of the tab stacked in a thickness direction of the electrode group, and a lead including a connecting portion electrically connected to a terminal and a collector portion bifurcated from the connecting portion to hold the sandwiching member between the bifurcated portions.

PRIOR ART DOCUMENTS

Patent Documents

[Patent Document 1] Japanese Patent Laid-Open No. 2011-071109
[Patent Document 2] Japanese Patent Laid-Open No. 2006-134803
[Patent Document 3] Japanese Patent Laid-Open No. 2012-009332

DISCLOSURE OF THE INVENTION

Problems to be Solved by the Invention

In the above configuration, however, the sandwiching member and the collector portion need to be thick in order to ensure a high strength in these members. This increases the cost and makes it difficult to reduce the size of the battery.

It is thus an object of the present invention to provide a battery with a reduced size and a reduced cost.

Means for Solving the Problems

To solve the problem described above, the present invention provides (1) a battery including a plurality of cells housed in a battery container, wherein the battery container is formed of an insulating material and includes a plurality of housing portions formed by an inner wall portion of the battery container, each of the housing portions housing an associated one of the cells, and a conductive member for use in connecting the plurality of cells is embedded in a wall portion of the battery container.

(2) In the configuration of (1), the housing portion can have a shape conforming to an outer face of the cell and can be in contact with the outer face of the cell. According to the configuration of (2), since each of the cells is held by the inner wall portion of the battery container, any displacement of the cell can be avoided.

(3) In the configuration of (1) or (2), the cell may be a winding provided by winding a power-generating sheet around an axis, the power-generating sheet including a positive electrode sheet and a negative electrode sheet stacked with a separator interposed between them.

(4) In the configuration of (3), the battery further includes sandwiching members, each of the sandwiching members sandwiching an electrode portion of the winding, wherein the conductive member can connect the sandwiching members to each other for adjacent ones of the windings.

(5) In the configuration of (1) to (4), the plurality of cells can be electrically connected in serial.

(6) In the configuration of (1) to (5), resin can be used as the insulating material.

(7) A battery pack includes the battery according to any one of (1) to (6), a case including a conducting path and housing the battery, the conducting path being configured to pass a heat exchange medium, and a heat conducting fin extending from the conductive member into the conducting path. According to the configuration of (7), the heat conducting fin can be used to efficiently perform the adjustment of the temperature of the battery.

(8) A method of manufacturing a battery including a battery module housed in a resin battery container made of resin, including a first step of connecting a plurality of cells through a conductive member to produce the battery module, and a second step of placing the battery module in a mold and injecting the resin into the mold having the battery module placed therein to perform injection molding of the resin battery container, wherein the injection molding is performed such that the conductive member is embedded in the resin at the second step.

Advantage of the Invention

According to the aspects of (1) and (8) of the present invention, the battery can be reduced in size and cost.

MODE FOR CARRYING OUT THE INVENTION

Embodiment 1

Figure 1:
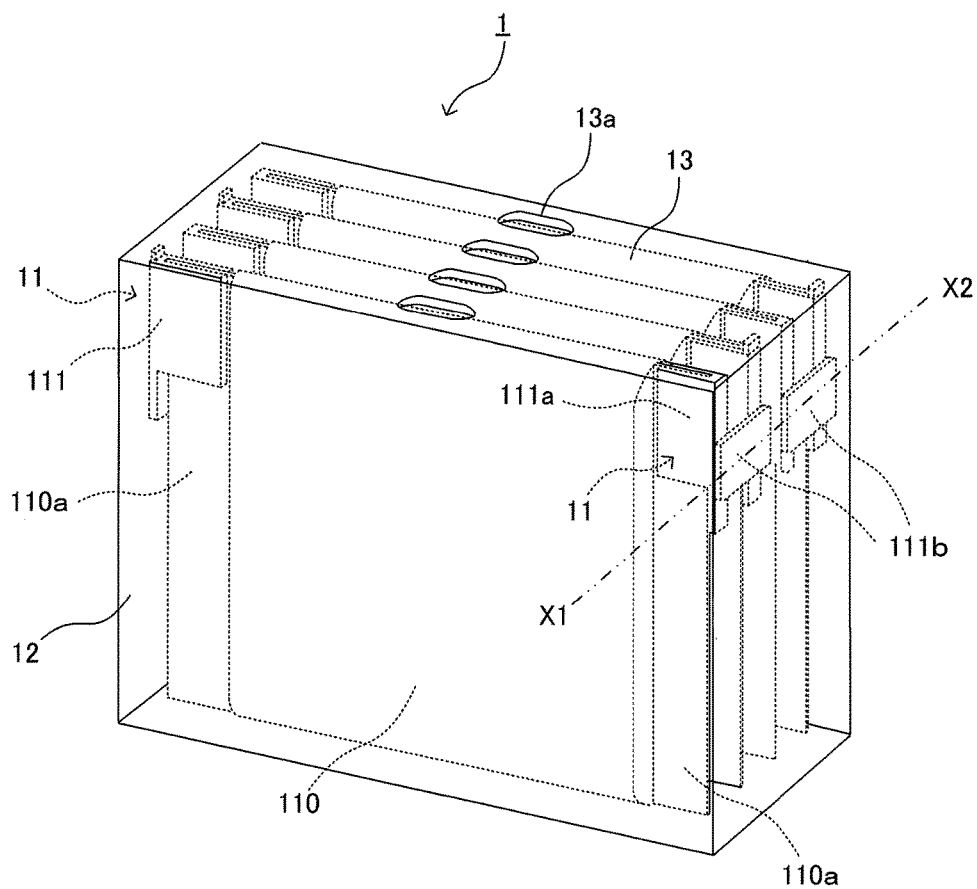
FIG. 1 is a perspective view of a battery of Embodiment 1.
Figure 2:
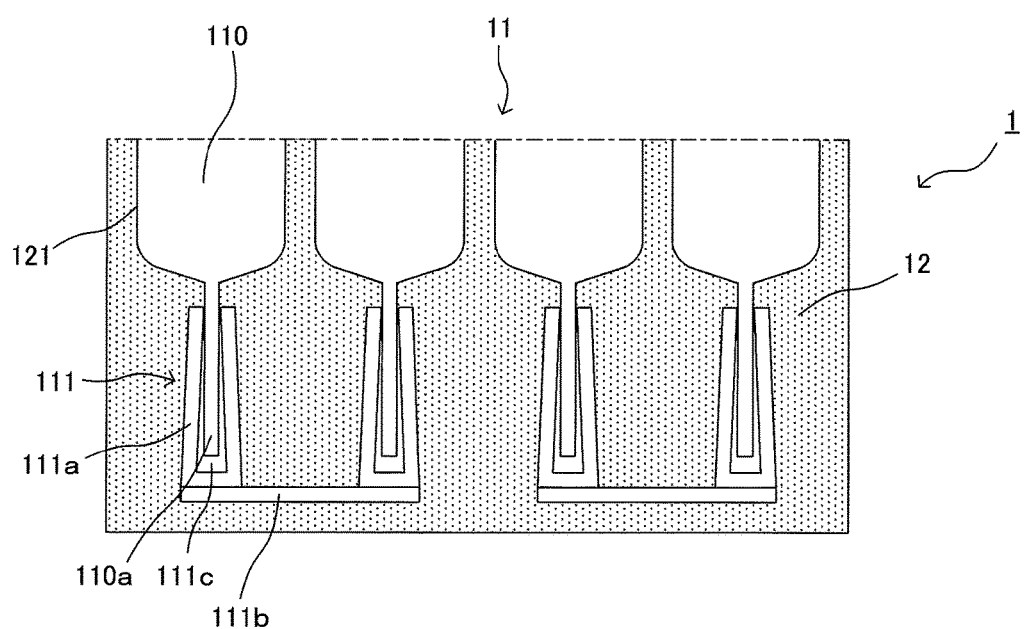
FIG. 2 is a section view of part of the battery of Embodiment 1.
Figure 2:
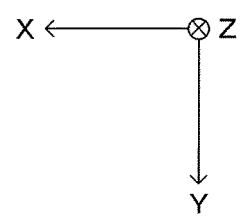
Figure 3:
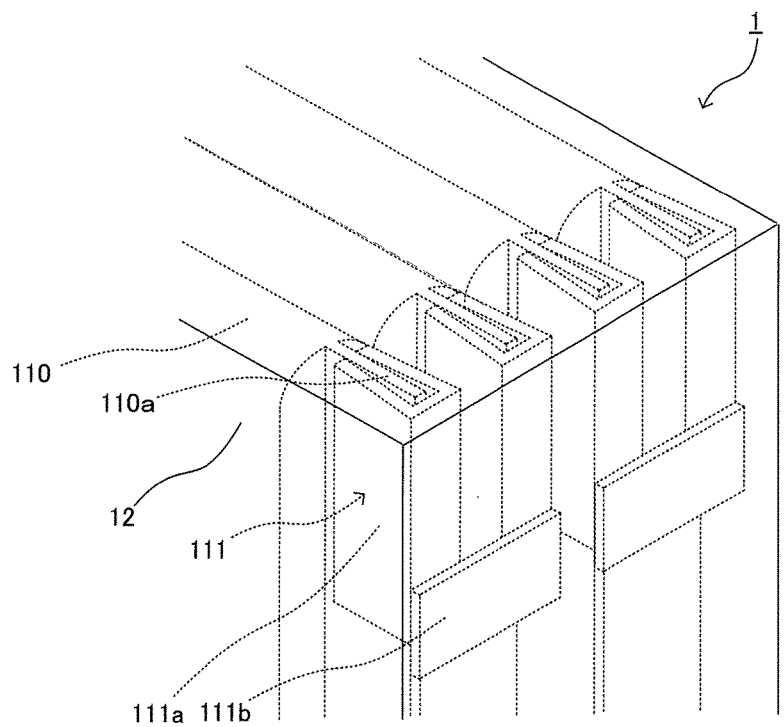
FIG. 3 is an enlarged perspective view of the battery of Embodiment 1.
Figure 3:
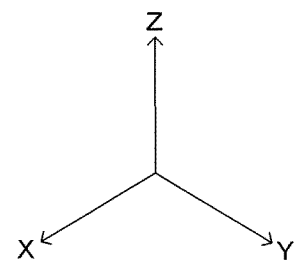

FIG. 1 is a perspective view of a battery according to Embodiment 1 and transparently shows elements necessary for description. FIG. 2 is a section view of part of the battery shown in FIG. 1 taken in an X-Y plane along a line X1-X2 indicated by a chain double-dashed line. FIG. 3 is an enlarged perspective view of part of the battery and transparently shows elements necessary for description. Referring to these figures, the battery 1 includes a battery module 11, a battery container body 12, and a lid component 13. The battery module 11 includes a plurality of cells 110. These cells 110 are aligned in an X axis direction.

The cell 110 includes a winding which is formed by placing a positive electrode element of sheet form on a negative electrode element of sheet form with a separator interposed between them and then winding them. The cell 110 may be a chargeable/dischargeable secondary battery. The positive electrode element is provided by applying a positive electrode active material onto a surface of a positive electrode collector foil. The negative electrode element is provided by applying a negative electrode active material onto a surface of a negative electrode collector foil.

The positive electrode element includes the collector foil and a positive electrode layer formed on the surface of the collector foil. The positive electrode layer includes the positive electrode active material, a conductive agent and the like. The positive electrode active material may be a Li—Co composite oxide such as $LiCoO_2$, a Li—Ni composite oxide such as $LiNiO_2$, a Li—Mn composite oxide such as spinel $LiMn_2O_4$, and a Li—Fe composite oxide such as $LiFeO_2$. The positive electrode active material may be a phosphate compound of a transition metal and lithium such as $LiFePO_4$ or a sulfated compound, a transition metal oxide or sulfide such as $V_2O_5$, $MnO_2$, $TiS_2$, $MoS_2$, and $MoO_3$, or $PbO_2$, AgO, NiOOH.

The negative electrode element includes the collector foil and a negative electrode layer formed on the surface of the collector foil. The negative electrode layer includes the negative electrode active material layer, a conductive agent and the like. The negative electrode active material may be a metal oxide, a lithium-metal composite oxide, and carbon.

An unapplied portion 110a is formed at each end of the winding, in a direction orthogonal to a diameter direction, that is, at each end of the winding in a Y axis direction. One of the unapplied portions 110a (which may hereinafter be referred to as a cell negative electrode terminal) is formed by tying the negative electrode collector foil, and the other unapplied portion 110a (which may hereinafter be referred to as a cell positive electrode terminal) is formed by tying the positive electrode collector foil. The unapplied portion 110a refers to a portion of the negative electrode collector foil or the positive electrode collector foil to which the active material is not applied.

A connecting unit 111 includes a pair of sandwiching members 111a and a connecting conductive plate 111b connecting these sandwiching members 111a. One of the paired sandwiching members 111a tightly holds the cell positive electrode terminal of one of the adjacent cells 110 in the X axis direction, and the other of the paired sandwiching members 111a tightly holds the cell negative electrode terminal of the other of the adjacent cells 110 in the X axis direction. Thus, the adjacent cells 110 are electrically connected in serial.

The serial connection of the plurality of cells 110 can achieve the battery 1 with a high output energy. The battery 1 can be used as a battery which supplies power to a motor for running of a vehicle. The vehicle may be an electric car which has only the motor as the power source, a hybrid car which has both the motor and an engine as the power source, or a plug-in hybrid car including the battery 1 which can be changed externally.

The sandwiching member 111a is connected to the cell positive electrode terminal (cell negative electrode terminal) only at its front end and is separated from the cell positive electrode terminal (cell negative electrode terminal) at its rear end. The separation of the rear end of the sandwiching member 111a from the cell positive electrode terminal (cell negative electrode terminal) provides a gap 111c through which an electrolytic solution can be injected into the winding. A specific method of injecting the electrolytic solution is described later.

Although the present embodiment includes connecting the plurality of cells 110 in serial, the plurality of cells 110 may be connected in parallel. In this case, the cell positive electrode terminal (cell negative electrode terminal) of one of the adjacent cells 110 is connected to the cell positive electrode terminal (cell negative electrode terminal) of the other of the cells 110 through the connecting unit 111. The parallel connection of the plurality of cells 110 can achieve the battery 1 with a larger battery capacity. As described above, the battery 1 can be used as the battery which supplies power to the motor for running of the vehicle.

The battery container body 12 has a plurality of housing portions 121 formed therein to accommodate the respective cells 110. Each of the housing portions 121 is formed by an inner wall portion of the battery container body 12. Each housing portion 121 has a shape conforming to an outer face of the associated cell 110 and is in contact with the outer face of the cell 110. The contact of the outer face of the battery module 11 with the inner wall portion of the battery container body 12 can securely hold the battery module 11. Since any independent member for holding the battery module 11 is not required, an increase in size of the battery 1 can be prevented.

A known method of restraining the battery module 11 includes attaching a restraint band to the outside of a case housing the battery module 11 such that the restraint band presses the case. This method, however, requires the attachment of the restraint band to the case, so that an assembly process is complicated and the cost is increased. Since the battery module 11 is restrained by the battery container body 12 in the battery 1 of the present embodiment, the restraint of the battery module 11 can be performed without providing the restraint band. This can prevent the increased cost while avoiding the complication of the assembly process.

Since the conventional assembly process includes inserting the battery module 11 into a bottomed tubular case, a clearance needs to be provided between the battery module 11 and an inner face of the case. The case necessarily has a large size, and a size reduction of the battery 1 is not possible. In contrast, the clearance can be eliminated in the present embodiment since the inner wall portion of the battery container body 12 is in contact with the battery 1. This can prevent an increase in size of the battery 1. The elimination of the clearance can also reduce the amount of the electrolytic solution to be injected into the case. Since most of the injected electrolytic solution flows into the winding according to the configuration of the present embodiment, wasted injection can be reduced.

Since the battery module 11 is restrained by the inner wall portion of the battery container body 12, a support member for hanging the battery module 11 in the battery container body 12 can be omitted. The omission can increase the space for placing the battery module 11 in the battery container body 12 to increase the size of the battery module 11 while preventing an increase in size of the battery 1.

The battery container body 12 is made of an insulating material. The insulating material may be resin. The battery container body 12 made of the insulating material allows an independent member for providing insulation between the cells 110 to be omitted. As a result, the battery module 11 can be reduced in size. The holding of the battery module 11 is facilitated, so that the number of the cells 110 can be increased or reduced easily.

If the battery container body 12 is made of metal such as aluminum, some measures should be taken against corrosion of the case, decomposition of the electrolytic solution and the like. In the present embodiment, however, such measures are not required since the battery container body 12 is made of resin.

The connecting conductive plate 111*b* is embedded in the resin forming the battery container body 12. This can increase the strength in holding the connecting conductive plate 111*b*. Consequently, the connection reliability of the connecting conductive plate 111*b* can be enhanced.

Figure 4:
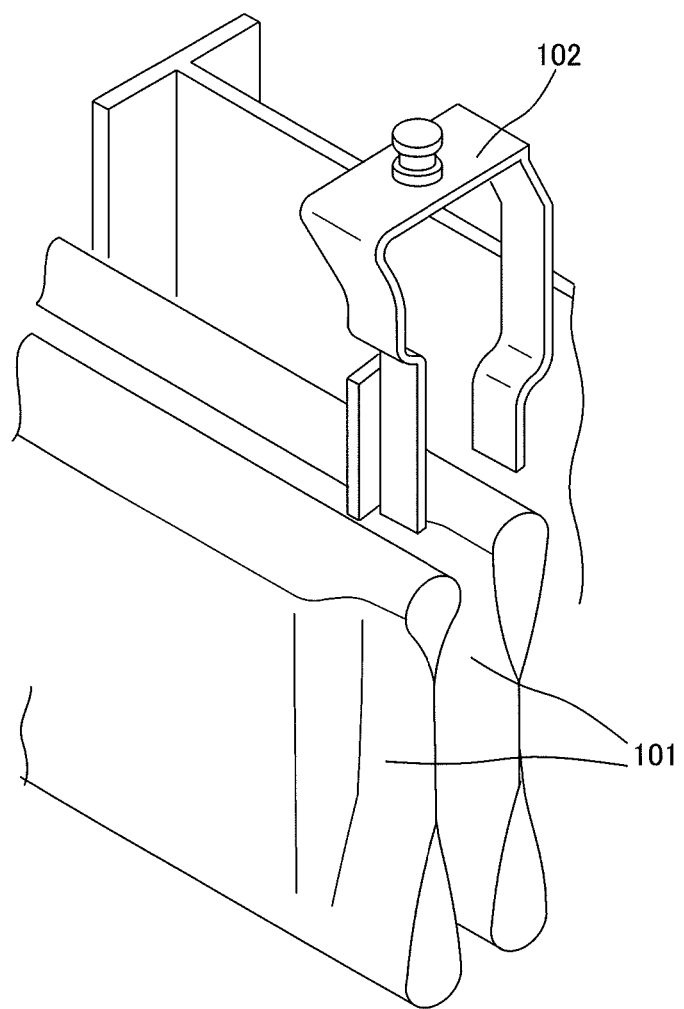
FIG. 4 is a perspective view of part of a conventional battery module.

FIG. 4 is a perspective view of part of a conventional battery module. Referring to FIG. 4, the conventional battery module inevitably involves connecting a collector terminal 102 to connect windings 101 over a partitioning wall which separates adjacent cells. This increases the length of the collector terminal 102 to increase the resistance, thereby producing heat at a high temperature during charge and discharge. In contrast, the configuration of the present embodiment includes connecting the cell positive electrode terminal of one of the adjacent cells 110 with the cell negative electrode terminal of the other of the cells 110 through the connecting conductive plate 111*b* extending in the direction in which the cells 110 are aligned, so that the length of the connecting conductive plate 111*b* can be reduced. An increased resistance in the connecting conductive plate 111*b* can be prevented to lower the temperature in heat production during charge and discharge.

Modification 1

Figure 5:
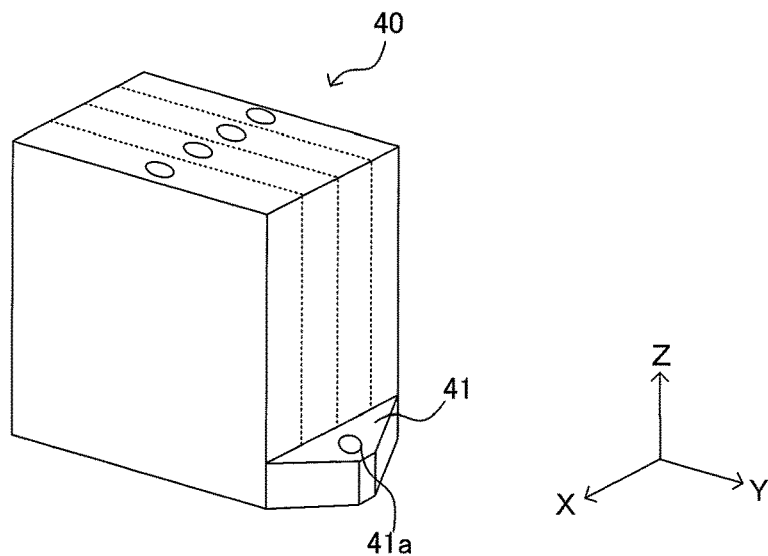
FIG. 5 is a perspective view of a battery of Modification 1.

FIG. 5 is a perspective view of a battery according to Modification 1. Since the internal structure of the battery is identical to that of the battery of Embodiment 1, description is not repeated. Referring to FIG. 5, a foot portion 41 is provided on an outside face of the battery 40. The foot portion 41 has a fastening hole portion 41*a* formed therein. For housing the battery 40 into a case, a fastening bolt, not shown, can be inserted into an opening portion formed in the case and the fastening hole portion 41*a* to fix the battery 40. For fastening the battery 40 to, for example a floor panel of the vehicle, a fastening bolt, not shown, may be inserted into an opening portion formed in the floor panel and the fastening hole portion 41*a* to fix the battery 40.

Modification 2

Figure 6:
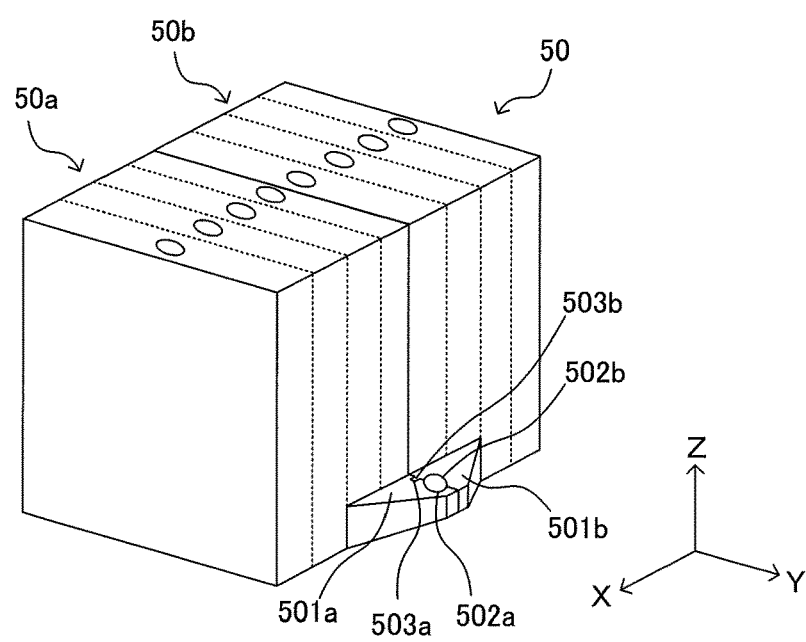
FIG. 6 is a perspective view of an assembled battery of Modification 2.

FIG. 6 is a perspective view of an assembled battery according to Modification 2. Referring to FIG. 6, the assembled battery 50 includes two batteries 50*a* and 50*b*. Since the internal structure of the battery is identical to that of the battery of Embodiment 1, description is not repeated. A flange portion 501*a* is formed on a side face of the battery 50*a*, and a flange portion 501*b* is formed on a side face of the battery 50*b*. The flange portion 501*a* has a semicircular opening portion 502*a* extending in a Z axis direction and a fit recessed portion 503*a* recessed in the X axis direction. The flange portion 501*b* has a semicircular opening portion 502*b* extending in the Z axis direction and a fit protruding portion 503*b* protruding in the X axis direction.

In an assembled state of the assembled battery 50, the fit protruding portion 503*b* of the flange portion 501*b* is fitted into the fit recessed portion 503*a* of the flange portion 501*a* to bring the batteries 50*a* and 50*b* together. The strength in bonding the batteries 50*a* and 50*b* may be increased by welding the bonding faces of the flange portions 501*a* and the flange portion 501*b*. The strength in bonding the batteries 50*a* and 50*b* may be further increased through welding of the entire contact faces of the batteries 50*a* and 50*b*.

In the assembled state of the assembled battery 50, the semicircular opening portion 502*a* of the flange portion 501*a* is opposite to the semicircular opening portion 502*b* of the flange portion 501*b* to form a single opening portion. A fastening member is inserted into the opening portion to fix the assembled battery 50. Since the method of fixing the assembled battery 50 is identical to that in Modification 1, description is not repeated.

Since the flange portions 501*a* and 501*b* are connected to each other in the configuration of the present modification, these two flange portions 501*a* and 501*b* can support the battery 50*b* when an external force is applied to the battery 50*b*, for example. Thus, a higher fixing strength can be provided than in a method of fixing the battery with a single flange portion.

Modification 3

Figure 7:
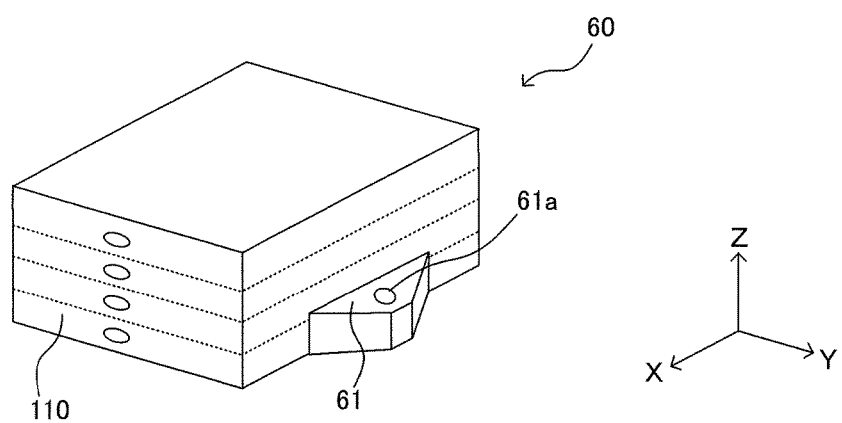
FIG. 7 is a perspective view of battery of Modification 3.
Figure 8:
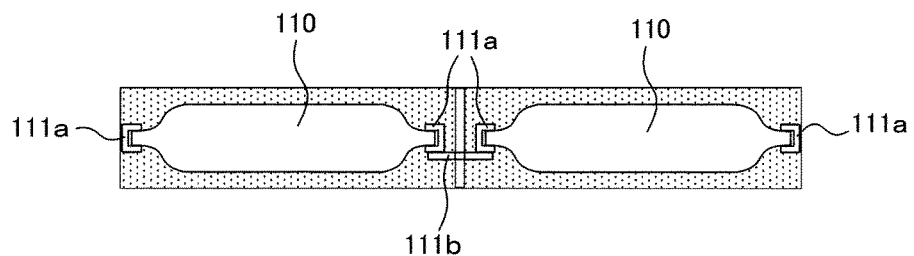
FIG. 8 is a diagram showing an exemplary battery module.
Figure 9:
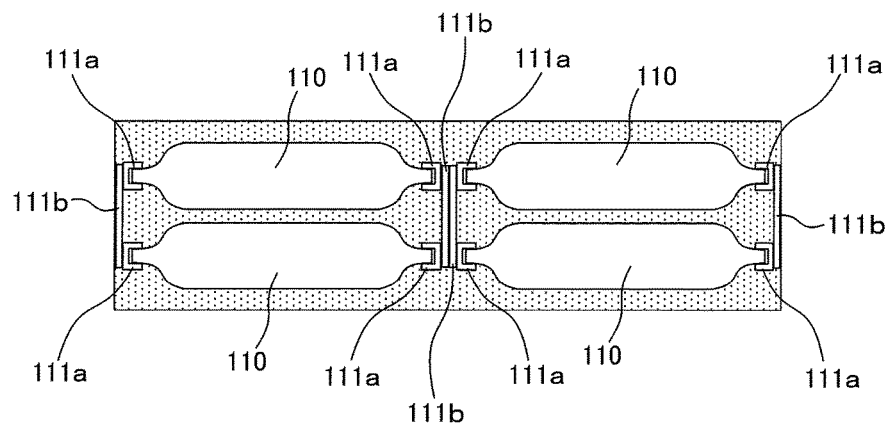
FIG. 9 is a diagram showing another exemplary battery module.

FIG. 7 is a perspective view of a battery according to Modification 3. Referring to FIG. 7, the battery 60 according to the present modification is provided by vertically arranging a plurality of cells 110. A foot portion 61 is provided on an outside face of the battery 60. The foot portion 61 has a fastening hole portion 61*a*. Since a method of attaching the battery 60 is as described in Modification 1, description is not repeated. As described in Modifications 1 to 3, when the configuration including the battery module held by the surrounding solidified resin is employed, the battery of various shapes can be simply manufactured. For example, as shown in FIG. 8, the battery module 11 may have an arrangement in which cells 110 are aligned horizontally and connected in serial, or as shown in FIG. 9, the battery module 11 may have an arrangement in which a group of cells 110 are connected in parallel and such groups are connected in serial.

Modification 4

Although the above embodiments include the cell 110 formed of the winding, the present invention is not limited thereto. The cell 110 may have a structure provided by stacking a positive electrode sheet and a negative electrode sheet with a separator interposed between them to form a power-generating sheet and layering a plurality of such power-generating sheets in order.

Embodiment 2

Figure 10:
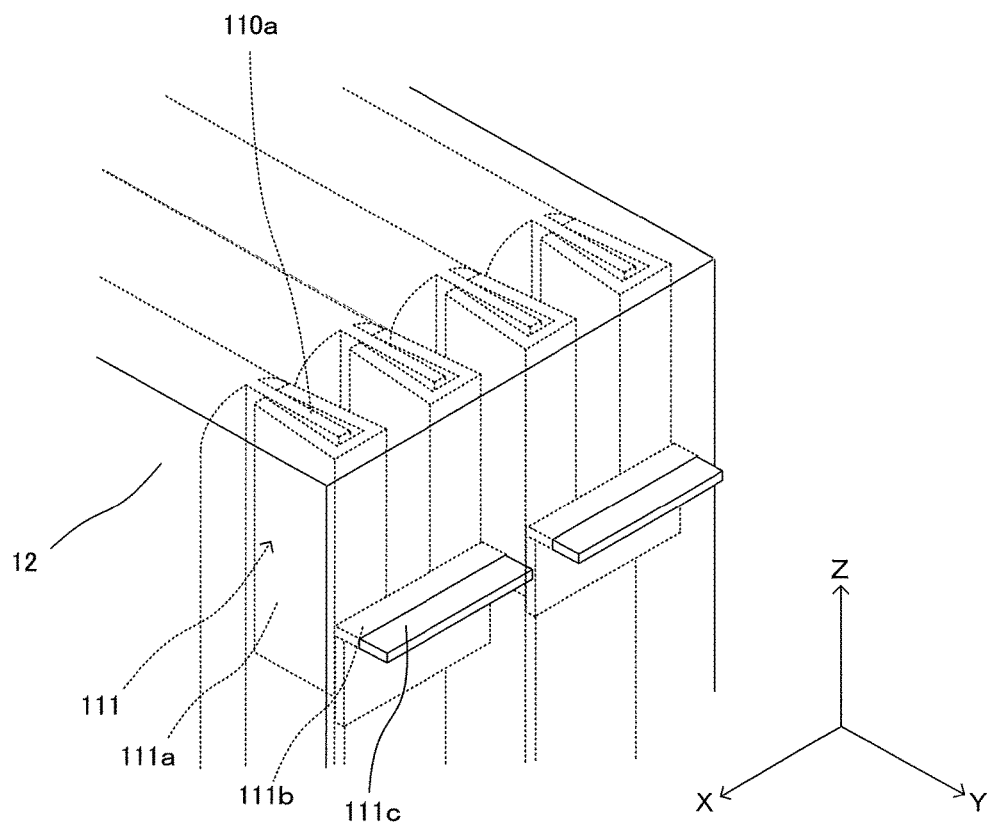
FIG. 10 is an enlarged perspective view of a battery of Embodiment 2.
Figure 11:
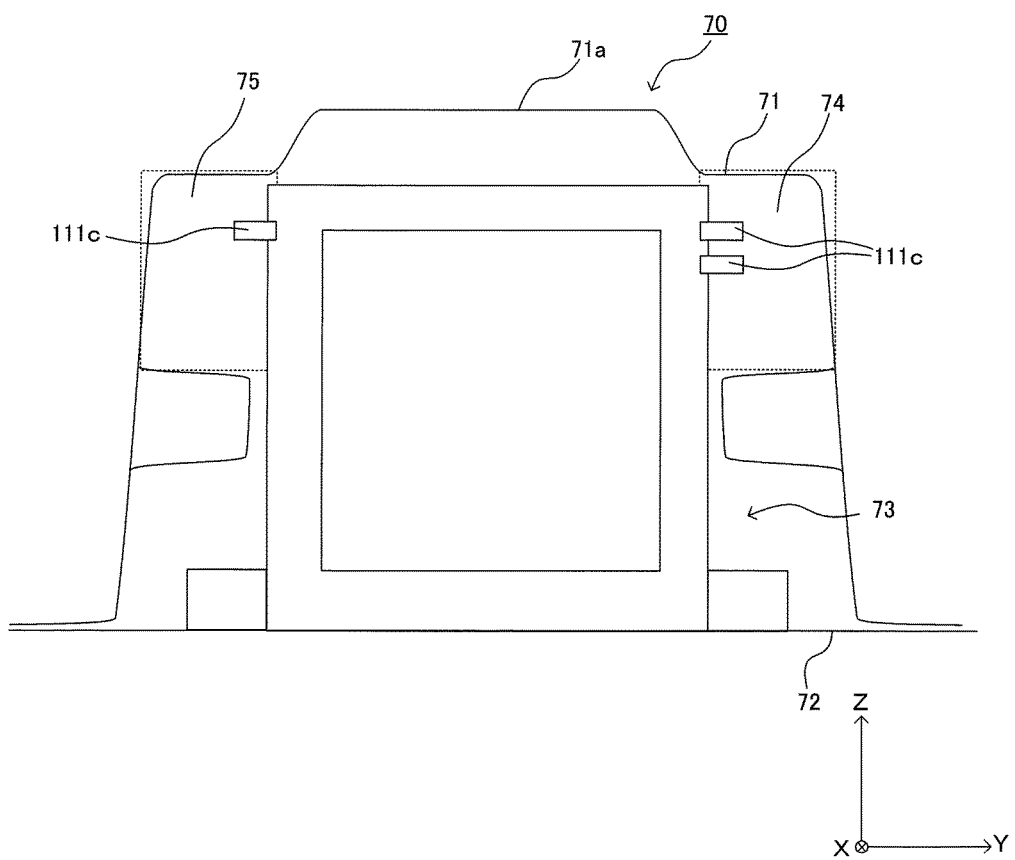
FIG. 11 is a section view of a battery pack including the battery of Embodiment 2.

FIG. 10 is an enlarged perspective view of a battery according to Embodiment 2. FIG. 11 is a section view of a battery pack housing the battery according to Embodiment 2. The battery pack 70 includes an upper case 71 (corresponding to a case), a lower case 72 (corresponding to the case), and the battery 73. The upper case 71 has a protruding portion 71*a* formed on an upper face, and a gas exhaust path is formed in a space surrounded by the protruding portion 71*a* and the battery 73. The gas exhaust path refers to a path through which gas emitted from the battery 73 is exhausted to the outside of the battery pack 70 in an abnormal state of the battery such as overcharge and overdischarge. The upper case 71 and the lower case 72 are coupled with a fastening bolt (not shown) into one unit.

Areas surrounded by dotted lines inside the upper case 71 show conducting paths 74 and 75. The conducting paths 74 and 75 extend in the X axis direction along which a heat exchange medium can flow. The battery 70 produces heat due to charge and discharge and is deteriorated if the heat production is left unaddressed. When the battery 70 produces heat, cooled air can be introduced into the conducting paths 74 and 75 to cool the battery 70. Alternatively, when the battery 70 is at an extremely low temperature, the internal resistance is increased to reduce the input/output characteristic. To address this, when the battery 70 is at such an extremely low temperature, heated air can be introduced into the conducting paths 74 and 75 to heat the battery 70.

The heat exchange medium can be supplied to the conducting paths 74 and 75 through the operation of a blower, not shown. The battery pack 70 can be used as a battery for supplying power to a motor for running of a vehicle. In this case, the operation of the blower can take in air present inside the car or outside the car, and the taken air can be supplied into the conducting paths 74 and 75.

The battery 70 has the same configuration as that of the battery 40 of Modification 1 except for heat conducting fins 111c. The heat conducting fin 111c extends from a connecting conductive plate 111b into the conducting path 74 or 75 through a battery container body 12. Thus, the heat conducting fin 111c is cooled by the cooling wind flowing in the conducting path 74 or 75. The cooling of the heat conducting fin 111c can cool the connecting conductive plate 111b to prevent a temperature rise in the battery 70 which produces heat during charge and discharge. The heat conducting fin 111c is heated by the heated wind flowing in the conducting path 74 or 75. The heating of the heat conducting fin 111c can heat the connecting conductive plate 111b to improve the input/output characteristic of the battery 70 at the extremely low temperature.

The heat conducting fins 111c are preferably positioned not to overlap one another when viewed from the direction in which the heat exchange medium is delivered. If the heat conducting fins 111c are positioned to overlap one another, the heat conducting fin 111c located upstream obstructs the movement of the heat exchange medium to prevent the efficient cooling or heating of the heat conducting fin 111c located downstream.

The heat conducting fin 111c is formed in a flat plate shape with a front face and a rear face extending in the direction in which the heat exchange medium moves. This shape increases the area of contact between the heat conducting fin 111c and the heat exchange medium to allow the efficient adjustment of temperature of the connecting conductive plate 111b. In addition, the shape can avoid an increase in pressure loss when the heat exchange medium is delivered.

Since the present modification includes the gas exhaust path provided between the protruding portion 71a and the upper face of the battery module 11 and includes the conducting paths 74 and 75 provided between the side faces of the battery module 11 and the upper case 71, the gas exhaust path and the conducting paths 74 and 75 can be separated from each other.

Since the battery container body 12 is made of an insulating material, the metallic members such as the upper case 71 and the lower case 72 can be in contact with the battery container body 12. In this case, the holding power for the battery module 11 is added by the upper case 71 and the like, and even when stringent strength requirements are imposed in transportation regulations, the efficient holding of the entire battery module 11 can be satisfactorily achieved.

Embodiment 3

Figure 12:
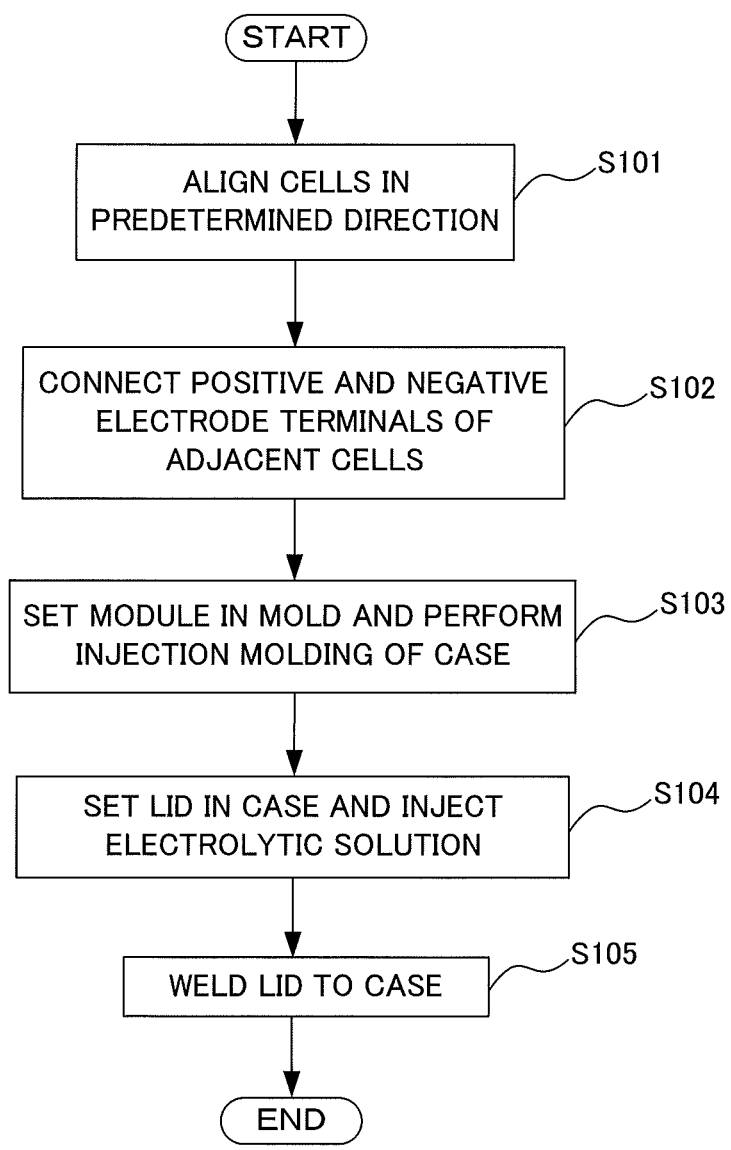
FIG. 12 is a flow chart sequentially showing the steps of manufacturing the battery.

Next, a method of manufacturing the battery of Embodiment 1 is described with reference to a flow chart of FIG. 12. At step S101, the cells 110 are aligned in a predetermined direction. The alignment of the cells is performed such that the cell positive electrode terminal of one of the adjacent cells 110 and the cell negative electrode terminal of the other of the adjacent cells 110 are placed side by side in the predetermined direction. The aligned cells 110 are positioned by using a jig.

At step S102, the adjacent cells 110 are connected through the connecting unit 111 to produce the battery module 11. The connecting method may include swaging or welding. Although the present embodiment involves using the connecting unit 111 to connect the adjacent cells 110, the connection may be performed by connecting the sandwiching member 111a to the cell positive electrode terminal of one of the adjacent cells 110, connecting the sandwiching member 111a to the cell negative electrode terminal of the other of the adjacent cells 110, and then connecting these sandwiching members 111a through the connecting conductive plate 111b.

At step S103, the battery module 11 is set in a mold having a shape conforming to the battery container body 12. Thermally melted resin is injected into the mold, and then cooled and solidified to form the battery container body 12. When a certain amount of resin is injected, the injected resin applies pressure to the battery module 11. The injection is performed with the pressure monitored, so that the pressure applied to the battery module 11 by the cured resin (that is, the battery container body 12) can be controlled at a desired value. This can achieve close contact of the power-generating element in the winding to prevent a reduction in input/output characteristic of the battery module 11. According to this method, the battery module 11 can be restrained with a simpler structure than in the method of restraining the battery module with the restraint band.

At step S104, the lid component 13 made of resin is set in the opening portion of the battery container body 12, and the electrolytic solution is injected into the battery container body 12 through an electrolytic solution injection port 13a. After the injection into the battery container body 12, the electrolytic solution flows through the gap 111c formed between the connecting unit 111 and the cell positive electrode terminal (cell negative electrode terminal) 110a into the winding. The battery container body 12 has a conducting path (not shown) formed therein for directing the electrolytic solution injected through the electrolytic solution injection port 13a to the gap 111c.

At step S105, the lid component 13 is welded to an inner face of the battery container body 12 for fixing. According to the method described above, the battery module 11 is manufactured with the connecting unit 111 set on the cell 110, so that sufficient connection reliability can be realized.

For forming the foot portion 41 or the like on the case body as shown in Modifications 1 to 3, the mold needs to have a portion shaped to the foot portion 41 or the like. For forming the heat conducting fin 111c on the connecting unit 111 as described in Embodiment 2, the resin filled area within the mold needs to be recessed to place the ends of the heat conducting fins 112 extending into the conducting paths 74 and 75.

The invention claimed is:

1. A battery comprising:
   a plurality of winding cells housed in a battery container, each winding cell provided by winding a power-generating sheet around an axis, the power-generating sheet including a positive electrode sheet and a negative electrode sheet stacked with a separator interposed between them,
   wherein the winding cell includes a positive electrode terminal in which a collector foil of the positive electrode sheet are tied and a negative electrode terminal in which a collector foil of the negative electrode sheet are tied, wherein the battery container is formed of an insulating material and includes a plurality of housing portions formed by an inner wall portion of the battery container, each of the housing portions housing an associated winding cell, being in direct contact with the associated winding cell and including a curved surface formed along an outer surface of each of the positive electrode terminal and the negative electrode terminal; and sandwiching members, each of the sandwiching members sandwiching an electrode portion that is positioned at both ends, in a first direction, of each winding cell, and a conductive member connecting the sandwiching members to each other for adjacent ones of the winding cells to connect the plurality of winding cells are embedded in a wall portion provided on both end sides, in the first direction, of the housing portion, wherein the sandwiching members each include a pair of arms that sandwich the respective electrode portion in a second direction orthogonal to the first direction, and a space between the arm and the electrode portion extends in a vertical direction orthogonal to the first direction and the second direction and communicates with an outside of the space through top ends of the sandwiching members in the vertical direction.

2. The battery according to claim 1, wherein the housing portion has a shape conforming to an outer face of the winding cell.

3. The battery according to claim 1, wherein the plurality of winding cells are electrically connected in serial.

4. The battery according to claim 1, wherein the insulating material is resin.

5. A battery pack comprising:
the battery according to claim 1;
a case including a conducting path and housing the battery, the conducting path being configured to pass a heat exchange medium; and
a heat conducting fin extending from the conductive member into the conducting path.

6. A method of manufacturing a battery including a battery module housed in a resin battery container made of resin, the battery module including a plurality of winding cells provided by winding a power-generating sheet around an axis, the power-generating sheet including a positive electrode sheet and a negative electrode sheet stacked with a separator interposed between them, the method comprising:

a first step of connecting a plurality of cells through a conductive member to produce the battery module; and a second step of placing the battery module in a mold and then injecting the resin into a gap formed between the mold and the battery module to perform injection molding of the resin battery container including a plurality of housing portions each housing an associated winding cell, wherein the injection molding is performed such that sandwiching members, each of the sandwiching members sandwiching an electrode portion that is positioned at both ends, in a first direction, of each winding cell and the conductive member are embedded in a wall portion provided on both end sides, in the first direction, of the housing portion and each winding cell is in direct contact with the respective housing portion at the second step, wherein the sandwiching members each include a pair of arms that sandwich the respective electrode portion in a second direction orthogonal to the first direction, and a space between the arm and the electrode portion extends in a vertical direction orthogonal to the first direction and the second direction and communicates with an outside of the space through top ends of the sandwiching members in the vertical direction, and wherein the method further comprises a third step of flowing electrolytic solution through the space between the arm and the electrode portion.

* * * * *